United States Patent [19]

Sugimoto

[11] Patent Number: 4,484,257
[45] Date of Patent: Nov. 20, 1984

[54] SERIES-CONNECTED ASSEMBLY OF ELECTRONIC SWITCHES

[75] Inventor: Hidehiko Sugimoto, Kasugai, Japan

[73] Assignee: Mitsubishi Denki Kabushiki Kaisha, Tokyo, Japan

[21] Appl. No.: 397,074

[22] Filed: Jul. 12, 1982

[51] Int. Cl.³ .............................................. H02M 7/00
[52] U.S. Cl. ..................... 363/124; 363/17; 363/50; 323/271
[58] Field of Search ................ 363/50, 52, 53, 55–58, 363/17, 65, 68, 124, 132, 136–138; 323/268, 270–271

[56] References Cited

U.S. PATENT DOCUMENTS

| | | | |
|---|---|---|---|
| 3,284,637 | 11/1966 | Berry | 363/124 X |
| 4,095,166 | 6/1978 | Shibata et al. | 323/271 |
| 4,203,151 | 5/1980 | Baker | 363/132 X |
| 4,270,163 | 5/1981 | Baker | 363/132 X |

FOREIGN PATENT DOCUMENTS 610269  5/1978  U.S.S.R. ................ 363/132

Primary Examiner—Peter S. Wong
Attorney, Agent, or Firm—Wenderoth, Lind & Ponack

[57] ABSTRACT

The present invention consists in connecting an auxiliary D.C. voltage source to a series-connected assembly constructed of electronic switches, whereby even when the electronic switches in the series-connected assembly have unequal switching rates, any overvoltage is not applied to the electronic switches and any power loss ascribable to the overvoltage is prevented.

6 Claims, 14 Drawing Figures

SERIES-CONNECTED ASSEMBLY OF ELECTRONIC SWITCHES

BACKGROUND OF THE INVENTION

This invention relates to a series-connected assembly of switching elements in a chopper which is located between a D.C. power source and a load and which controls D.C. power to be fed from the D.C. power source to the load.

In general, the series connection of switching elements in a chopper is performed in case a D.C. supply voltage can become higher than the breakdown voltage of one switching element (the collector-emitter breakdown voltage when the switching element is a transistor).

Heretofore, a device of this type has been as shown in FIG. 1. Referring to the figure, numeral 1 designates a D.C. power source. Numerals 2 and 3 designate transistors as switching elements, which are connected in series. Numerals 4 and 5 indicate diodes, which are also connected in series. The series-connected assembly of the transistors 2 and 3 and that of the diodes 4 and 5 are connected in a series inverse relationship so as to pass currents in directions reverse to each other, and both the ends of the resulting inverse series-connected assembly are connected to the corresponding ends of the D.C. power source 1. Numeral 6 indicates a load, both the ends of which are connected to the corresponding ends of the series assembly of the diodes 4 and 5. It is supposed that the load 6 is composed of a reactor and a resistor equivalently. Numerals 7 and 8 indicate overvoltage suppressors, which are connected in parallel with the transistors 2 and 3, respectively. Various overvoltage suppressors have been put into practical use, and an example thereof is shown in FIG. 2. In this figure, numeral 101 indicates a transistor, which corresponds to the transistor 2 or 3 in FIG. 1. Numeral 102 denotes a Zener diode as an overvoltage suppressor, which corresponds to the overvoltage suppressor 7 or 8 in FIG. 1. When the collector-emitter breakdown voltage of the transistor 101 is made at least the Zener voltage of the Zener diode 102 in advance no overvoltage is applied to the transistor 101. When, in the arrangement of FIG. 1, the voltage of the D.C. power source 1 is made less than double the Zener voltage in advance, any current does not flow steadily through the Zener diodes being the overvoltage suppressors 7 and 8. In the circuit of FIG. 1, the Zener voltage is usually selected such that (half of the voltage of the D.C. power source 1) < (Zener voltage) ° (voltage of the D.C. power source 1).

Shown at numeral 9 is a control unit, which delivers "on" and "off" signals to the transistors 2 and 3 for the purpose of controlling D.C. power to be supplied from the D.C. power source 1 to the load 6. Numeral 10 represents a lead which is connected to the base of the tranndicates a current detector, which detects current flowing through the load 6. Various current detectors have been put into practical use, and one employing a Hall element is illustrated here. Since the current detector employing the Hall element is common, the explanation thereof is omitted. Among connection leads 15–18 between the control unit 9 and the current detector 14, the connection leads 15–17 are respectively connected to the zero, plus and minus terminals of a control power source included in the control unit 9, and the connection lead 18 is a lead which provides a voltage of a value proportional to the value of the current flowing through the load 6 (current detection signal) with respect to the connection lead 15.

FIG. 3 shows an example of the control unit 9. In the figure, numeral 103 indicates the control power source, and symbols ∇, ⊖ and ⊕ denote the respective terminals of zero, plus and minus. Numeral 104 represents a current command device, which commands the current to flow through the load 6. The control of the current to flow through the load 6 is equivalent to the control of electric power to be fed to the load when the characteristics (impedance, counter electromotive force, etc.) of the load. Shown at numeral 105 is a comparator which has a hysteresis characteristic and which receives a current command signal Sr from the current command device 104 and the current detection signal Sd from the current detector 14 in FIG. 1 (the signal of the connection lead 18) so as to generate the "on" or "off" signals for the transistors in dependence upon the difference of the received signals.

FIG. 4 illustrates such a relationship, and its lower waveform depicts the output of the comparator 105. In the figure, a point A is the point at which a value obtained by subtracting the current detection signal Sd from the current command signal Sr has reached a positive hysteresis width and at which the signals of the transistors 2 and 3 change from the "off" signals to the "on" signals. When the transistors 2 and 3 have turned "on", the current which flows through the load 6 increases to reach a point B. The point B is the point at which the value obtained by subtracting the current detection signal Sd from the current command signal Sr has reached a negative hysteresis width and at which the signals of the transistors 2 and 3 change from the "on" signals to the "off" signals. When the transistors 2 and 3 have turned "off", the current which flows through the load 6 decreases to reach a point C. The point C is the same as the point A in the relationship between the current command signal Sr and the current detection signal Sd. Thenceforth, the transistors 2 and 3 are repeatedly turned "on" and "off", whereby the current to flow through the load 6 is controlled.

Referring to FIG. 3 again, numerals 106 and 107 indicate base power source-and-amplifiers, which amplify the transistor "on" or "off" signal from the comparator 105 and then deliver the amplified signals to the transistors 2 and 3. Since the base power source-and-amplifiers 106 and 107 are commonly used, the detailed description thereof is omitted. Connection leads 10–13 and 15–18 in FIG. 3 are the same as in FIG. 1.

Now, operations at the turn-on and -off of the transistors 2 and 3 in FIG. 1 will be described in detail with reference to FIG. 4.

First, when the transistors 2 and 3 are brought into their "on" states by the control unit 9, current from the D.C. power source 1 is applied to the load 6 through these transistors 2 and 3. When the current flowing through the load 6 has reached, for example, the point B in FIG. 4 in excess of a current value set by means of the current command device 104 (FIG. 3), the control unit 9 delivers the "off" signals to the transistors 2 and 3. When the transistors 2 and 3 have fallen into their "off" states, the current flowing through the load 6 is reduced while circulating via the diodes 5 and 4. Thus, when the current has reached, for example, the point C in FIG. 4, the control unit 9 delivers the "on" signals to the tranistors 2 and 3. When the transistors 2 and 3 have fallen into the "on" states, the current from the D.C. power source 1 is applied to the load again, and the current value increases gradually. In this way, the current substantially equal to the current set by the current command device 104 flows through the load 6. This current flowing through the load zigzags as indicated by $S_1$ in FIG. 4, on account of the hysteresis characteristic of the comparator 105 shown in FIG. 3.

The chopper arrangement shown in FIG. 1 can cause the current of the desired value to flow through the load 6 by operating as described above. However, the transistors 2 and 3 are seldom switched from "on" into "off" or vice versa at quite the same time. This leads to the disadvantage that a heavy loss of power is incurred by dispersion in the switching times of the transistors or by dispersion in the transfer times of the base power source-and-amplifiers in FIG. 3.

This disadvantage will be explained more concretely as to the case where the transistors 2 and 3 are switched from "off" into "on". By way of example, let it be supposed that the transistor 2 has turned "on" earlier. Then, since the Zener voltage of the overvoltage suppressor or Zener diode 8 connected in parallel with the transistor 3 is lower than the voltage of the D.C. power source 1, current flows along the D.C. power source 1, transistor 2, overvoltage suppressor 8, load 6 and D.C. power source. Since the overvoltage suppressor or Zener diode 8 allows the current to flow therethrough while holding the Zener voltage, the loss is considerably heavy. This condition continues till the turn-on of the transistor 3, at which the normal power is applied to the load 6. In this manner, when only one of the transistors 2 and 3 is in the "off" state during every switching operation of these transistors from "off" into "on" or vice versa, the Zener diode connected in parallel with the either transistor becomes conductive to incur the power loss as stated above.

As understood from the above, the prior-art chopper arrangement shown in FIG. 1 has the disadvantage that the loss of the overvoltage suppressor is affected by the discrepancy of the turn-on or turn-off times of the transistors 2 and 3 and that unless the dispersion is lessened, the loss becomes heavy.

SUMMARY OF THE INVENTION

The present invention has been made in order to eliminate the disadvantage of the prior art described above, and provides a novel series-connected assembly of electronic switches in which an auxiliary D.C. power source is connected to the electronic switches connected in series, whereby even when these electronic switches have unequal switching rates, an overvoltage is not exerted thereon, so that a power loss which is ascribable to the overvoltage does not occur.

BRIEF DESCRIPTION OF THE DRAWINGS

In the drawings, the same symbols indicate the same or corresponding parts.

DESCRIPTION OF THE PREFERRED EMBODIMENTS

Figure 1:
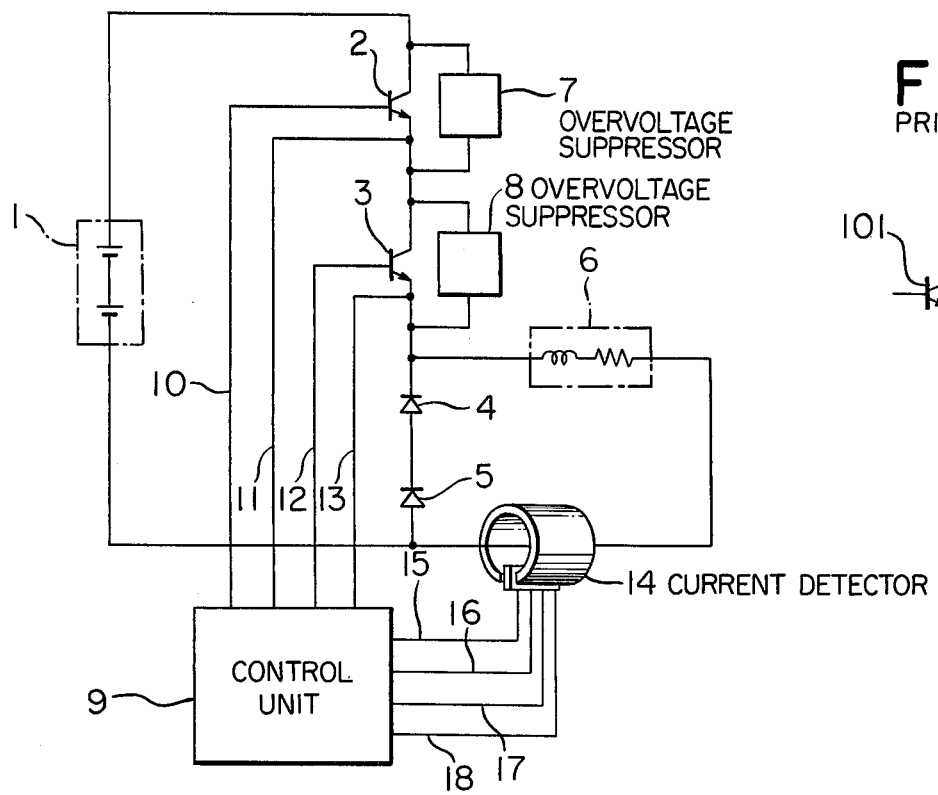
FIG. 1 is a circuit diagram showing an example of a prior-art chopper circuit in which switching elements are connected in series.
Figure 2:
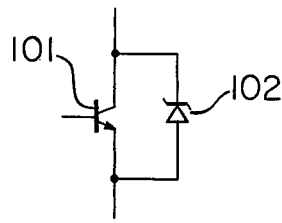
FIG. 2 is a circuit diagram showing an example of an overvoltage suppressor shown in FIG. 1.
Figure 5:
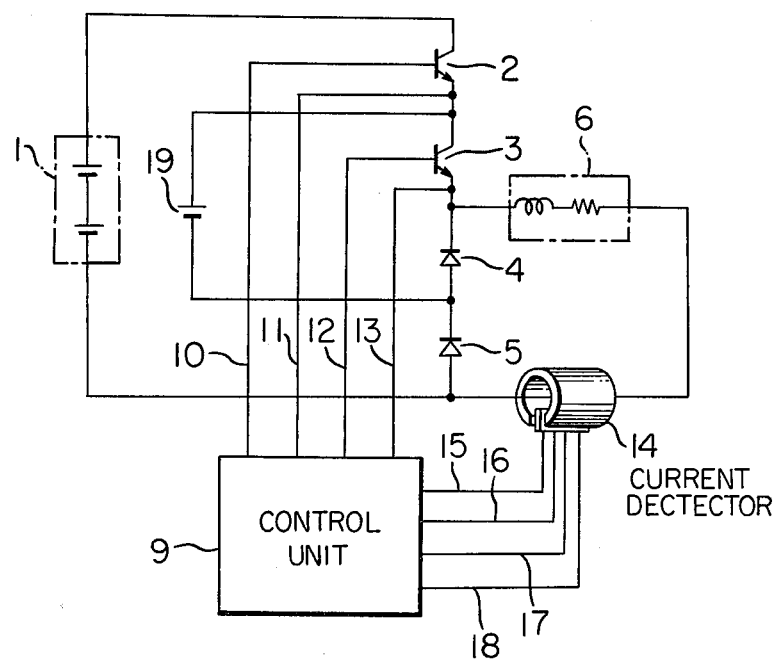
FIG. 5 shows an embodiment of the present invention, and is a circuit diagram of a chopper circuit in which switching elements are connected in series.

FIG. 5 shows an embodiment of the present invention. Referring to the figure, the arrangement is almost the same as that of FIG. 1 except that both the terminals of an auxiliary D.C. voltage source 19 are connected to the node between the transistors 2 and 3 and the node between the diodes 4 and 5. The voltage of the auxiliary D.C. voltage source 19 is selected to be lower than the voltage of the D.C. power source 1. In addition, a voltage value obtained by subtracting the voltage of the auxiliary D.C. voltage source 19 from the voltage of the D.C. power source 1, and the voltage value of the auxiliary D.C. voltage source 19 itself are selected to be lower than the breakdown voltage of each of the transistors 2 and 3 and the diodes 4 and 5.

There will now be described operations in FIG. 5 according to this invention. Assuming that the voltage of the auxiliary D.C. voltage source 19 is half of the voltage of the D.C. power source 1, there will be explained the case of, for example, the point A in FIG. 4 where the transistor 2 and 3 are switched "off" into "on". As in the description of FIG. 1, it is supposed that the transistors 2 and 3 have unequal switching times from "off" into "on" and that the transistor 2 has turned "on" earlier than the transistor 3. In this case, current flows along the D.C. power source 1, transistor 2, auxiliary D.C. voltage source 19, diode 4, load 6 and D.C. power source 1. The voltage of the auxiliary D.C. voltage source 19 is applied across the transistor 3 being in the "off" state, and any overvoltage is not applied across the same. The difference of the voltages of the D.C. power source 1 and the auxiliary D.C. voltage source 19 is applied across the diode 5 being in the "off" state, and any overvoltage is not applied across the same. It is supposed that conversely to the above, the transistor 3 has turned "on" earlier than the transistor 2. In this case, current flows along the auxiliary D.C. voltage source 19, transistor 3, load 6, diode 5 and auxiliary D.C. voltage source 19. The difference voltage between the D.C. power source 1 and the auxiliary D.C. voltage source 19 is applied across the transistor 2 being in the "off" state, and any overvoltage is not applied across the same. The voltage of the auxiliary D.C. voltage source 19 is applied across the diode 4 being in the "off" state, and any overvoltage is not applied across the same.

When both the transistors 2 and 3 have turned "on", current flows along the D.C. power source 1, transistors 2 and 3, load 6 and D.C. power source 1. At this time, the voltage of the D.C. power source 1 is applied to the diodes 4 and 5 in the "off" states in a substantially equally divided manner.

Figure 4:
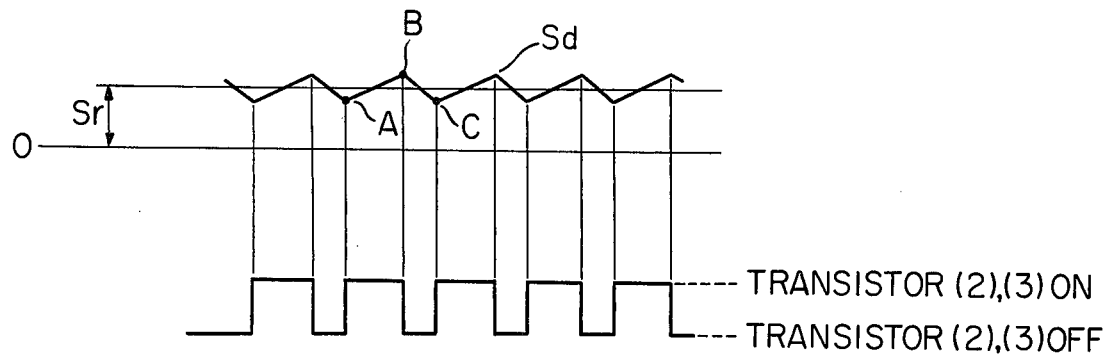
FIG. 4 is a signal waveform diagram showing operations in FIGS. 1 and 3.

At, for example, the point B in FIG. 4, the transistors 2 and 3 are switched from "on" into "off". It is also supposed herein that the transistors 2 and 3 have unequal switching times and that the former has turned "off" earlier than the latter. In this case, current flows along the auxiliary D.C. voltage source 19, transistor 3, load 6, diode 5 and auxiliary D.C. voltage source 19. This condition is the same as in the case where the transistor 3 has turned "on" earlier than the transistor 2 at the point A in FIG. 4. It is supposed that conversely the transistor 3 has turned "off" earlier than the transistor 2. In this case, current flows along the D.C. power source 1, transistor 2, auxiliary D.C. voltage source 19, diode 4, load 6 and D.C. power source 1. This condition is the same as in the case where the transistor 2 has turned "on" earlier than the transistor 3 at the point A in FIG. 4. When both the transistors 2 and 3 have turned "off", current flows along the diodes 5 and 4, load 6 and diode 5. At this time, the voltage of the D.C. power source 1 is applied to the transistors 2 and 3 in a substantially equally divided manner.

Thenceforth, similar operations are repeated at and behind the point C in FIG. 4.

In the above description, no overvoltage is applied to the transistor 2 or 3 or the diode 4 or 5. In addition, when the switching rates of the transistors 2 and 3 are unequal and only one of the transistors 2 and 3 is in the "on" state, the current flows through the auxiliary D.C. voltage source 19. It is to be understood, however, that since the phenomenon is the inflow or outflow of the current into or out of the voltage source, the loss in the case of employing the overvoltage suppressors 7 and 8 in FIG. 1 does not occur.

The direction of the current to flow through the auxiliary D.C. voltage source 19 is determined by which of the tranhe average current to flow through the auxiliary D.C. voltage source 19 can be made equal to zero or restricted to either direction by individually controlling the "on" periods or "off" periods of the transistors 2 and 3.

Figure 3:
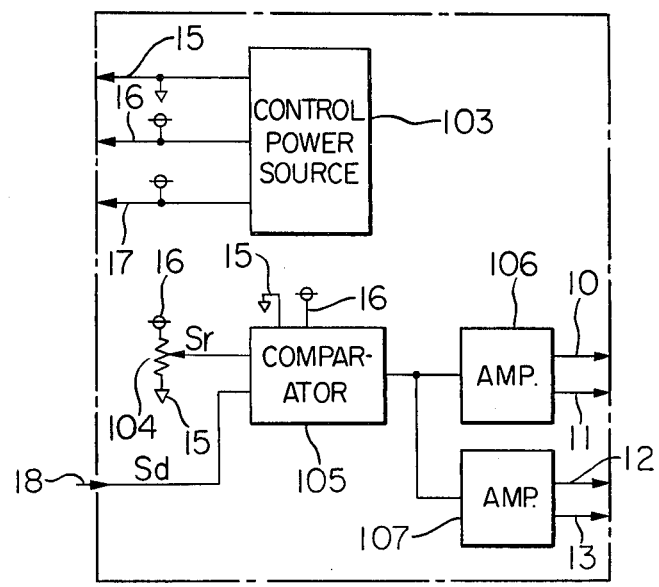
FIG. 3 is a circuit diagram showing an example of a control unit shown in FIG. 1.
Figure 6:
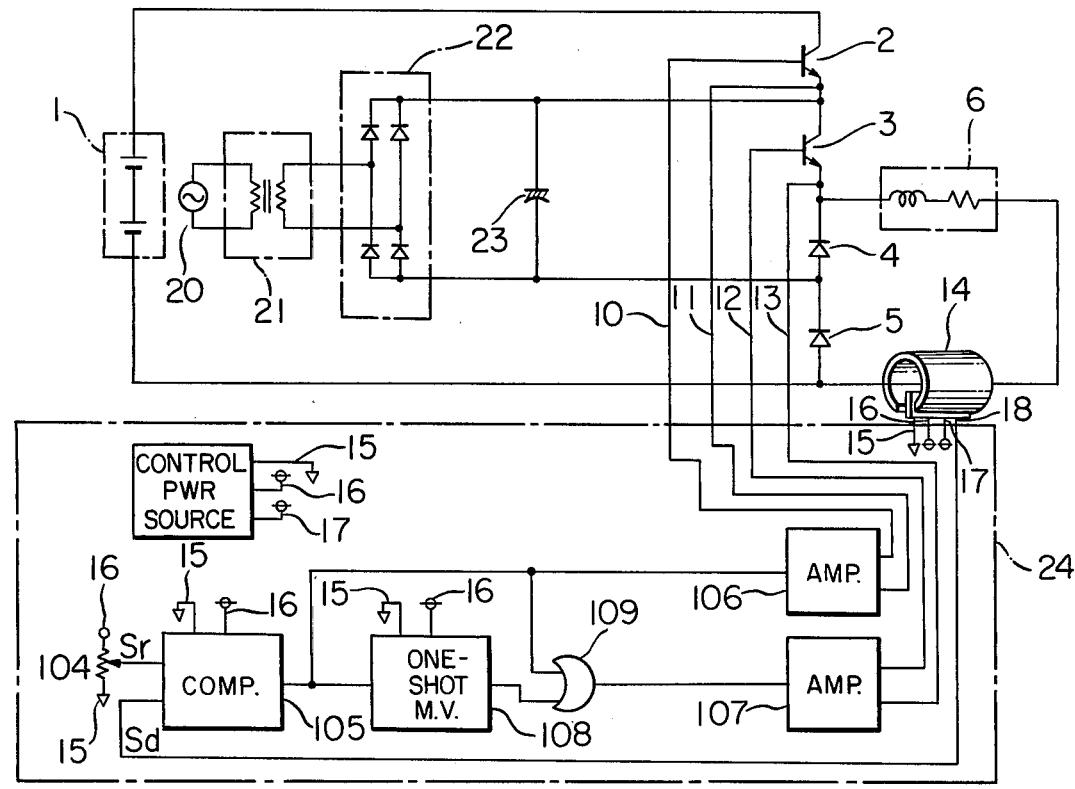
FIG. 6 is a circuit diagram showing another embodiment of the present invention.
Figure 7:
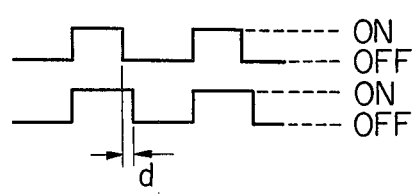
FIG. 7 is a signal waveform diagram showing an operation in FIG. 6.

FIG. 6 shows an embodiment for performing such control. In this figure, numerals 1–6, 10–18 and 103–107 correspond to the same numerals in FIGS. 3 and 5, and hence, they will not be repeatedly explained. Parts 20–23 are used instead of the auxiliary D.C. voltage source 19 in FIG. 5. The part 20 is an A.C. power source, 21 a transformer, 22 a rectifier, and 23 a capacitor. The output voltage of the transformer 21 with the voltage of the A.C. power source 20 transformed is rectified by the rectifier 22, and the capacitor 23 is charged by the rectified voltage. The charging voltage of the capacitor 23 is selected similarly to the voltage of the auxiliary D.C. voltage source 19 in FIG. 5. With the circuit constructed of the parts 20–23, current can be caused to flow only in the direction in which the output current of the rectifier 22 charges the capacitor 23. It is therefore favorable that the current caused to flow through the capacitor 23 due to the difference between the switching rates of the transistors 2 and 3 becomes equal to zero on the average or discharges the capacitor 23. To this end, since the difference of the switching times of the transistors 2 and 3 is preestimated, the "on" signal may be impressed on the transistor 3 longer by the difference $\alpha$ of the maximum switching times as illustrated in FIG. 7, whereby the transistor 3 continues the "on" state longer than the transistor 2 at all times. A control unit 24 shown in FIG. 6 is such that a one-shot multivibrator 108 and a logical or element 109 are added to the control unit 9 shown in FIG. 5. The output of the comparator 105 is connected directly to the base power source-and-amplifier 106 for the transistor 2, but it is connected to the base power source-and-amplifier 107 for the transistor 3 through the one-shot multivibrator 108 as well as the logical or element 109. The one-shot multivibrator 108 becomes operative whend 3. This signal and the signal from the comparator 105 are subjected to ORing by the logical or element 109, and the resulting signal is applied to the base power source-and-amplifier 107 of the transistor 3, whereby the base signal as shown in FIG. 7 can be obtained, and the current flowing through the capacitor 23 due to the difference of the switching times of the transistors 2 and 3 is only in the direction of flowing out therefrom. Accordingly, the voltage of the capacitor 23 becoe transistors 2 and 3.

Figure 8:
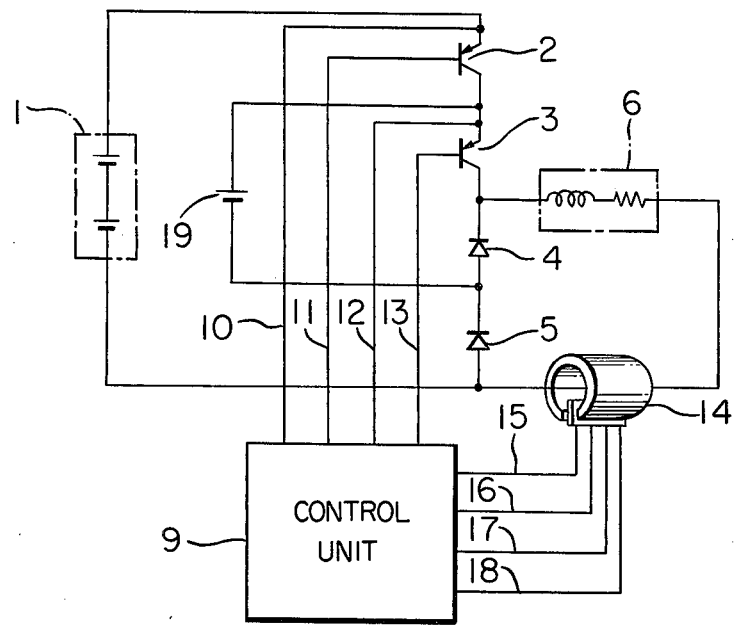
FIG. 8 is a circuit diagram showing another embodiment of the present invention.

While, in the above embodiment, the transistors 2 and 3 have been shown as N-P-N transistors, they may well be P-N-P transistors as shown in FIG. 8.

Figure 9:
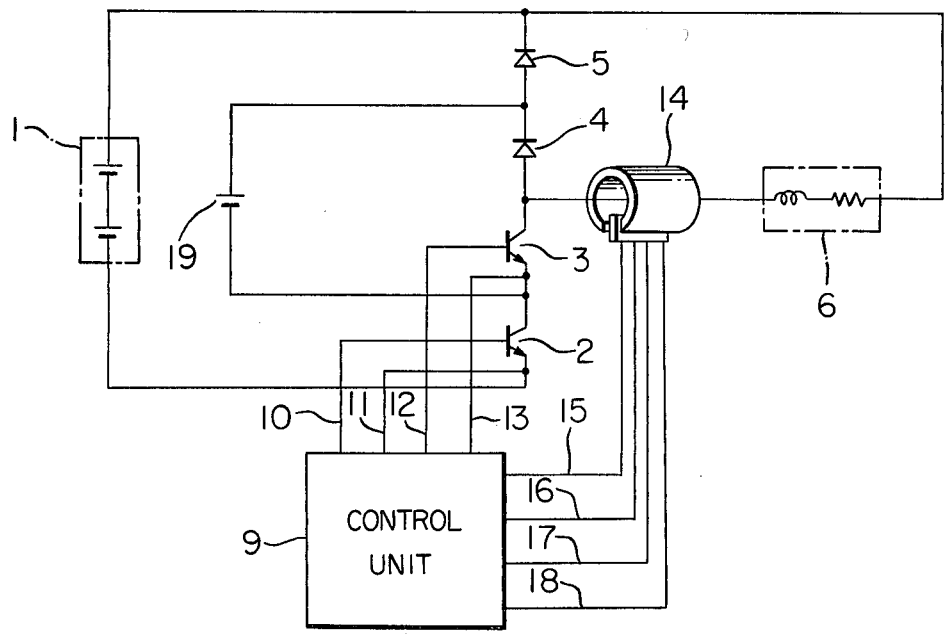
FIG. 9 is also a circuit diagram showing another embodiment of the present invention.

In addition, while the transistors have been connected on the positive electrode side of the D.C. power source 1 in the above embodiment, they may well be connected on the negative electrode side as shown in FIG. 9. In FIGS. 8 and 9, the same numerals as in FIG. 5 indicate the same parts.

Figure 10:
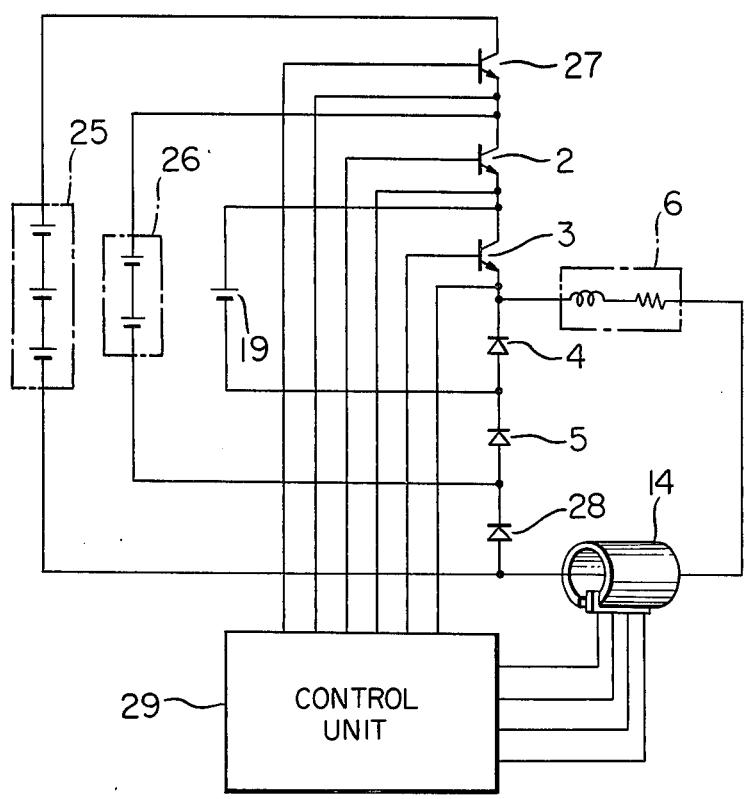
FIG. 10 is also a circuit diagram showing another embodiment of the present invention.

Further, while the number of the series-connected transistors or diodes has been two in the above embodiment, it may well be three or more. FIG. 10 shows an example in the case where the number of the series-connected elements is three. In the figure, numerals 2–6, 14 and 19 indicate the same parts as in FIG. 5. Numeral 25 denotes a D.C. power source, numeral 26 an auxiliary D.C. power source, numeral 27 a transistor, numeral 28 a diode, and numeral 29 a control unit. The voltages of the auxiliary D.C. power sources 19 and 26 are made similar to the voltage of the D.C. power source 1 in FIG. 5. The voltage of the D.C. power source 25 can be selected within a range of voltages which are not higher than the sum between the breakdown voltage of the transistor 27 or diode 28 and the voltage of the auxiliary D.C. power source 26 and which are higher than the voltage of the auxiliary D.C. power source 26. (By way of example, it is preferable to set the voltages of the power sources 26 and 19 at $\frac{2}{3}$ and $\frac{1}{3}$ of the voltage of the D.C. power source 25, respectively.) Operations can be considered similarly to those in FIG. 5, and are therefore omitted.

While, in the above, the transistors have been mentioned as the switching elements, similar effects are achieved even with other switching elements such as gate turn-off thyristors.

As set forth above, according to this invention, an auxiliary D.C. voltage source which has a voltage obtained by subtracting a voltage of at most the breakdown voltage of one switching element from the voltage of a D.C. power source is disposed, and it is connected to the series connection point of switching elements. Therefore, the invention has the effect that the series connection of the switching elements causing no loss can be realized.

By individually controlling the switching elements connected in series, the auxiliary D.C. voltage source may well be small in capacity, and current may be caused to flow in only one direction. Therefore, the invention has also the advantage that the device can be constructed at low cost.

Figure 11:
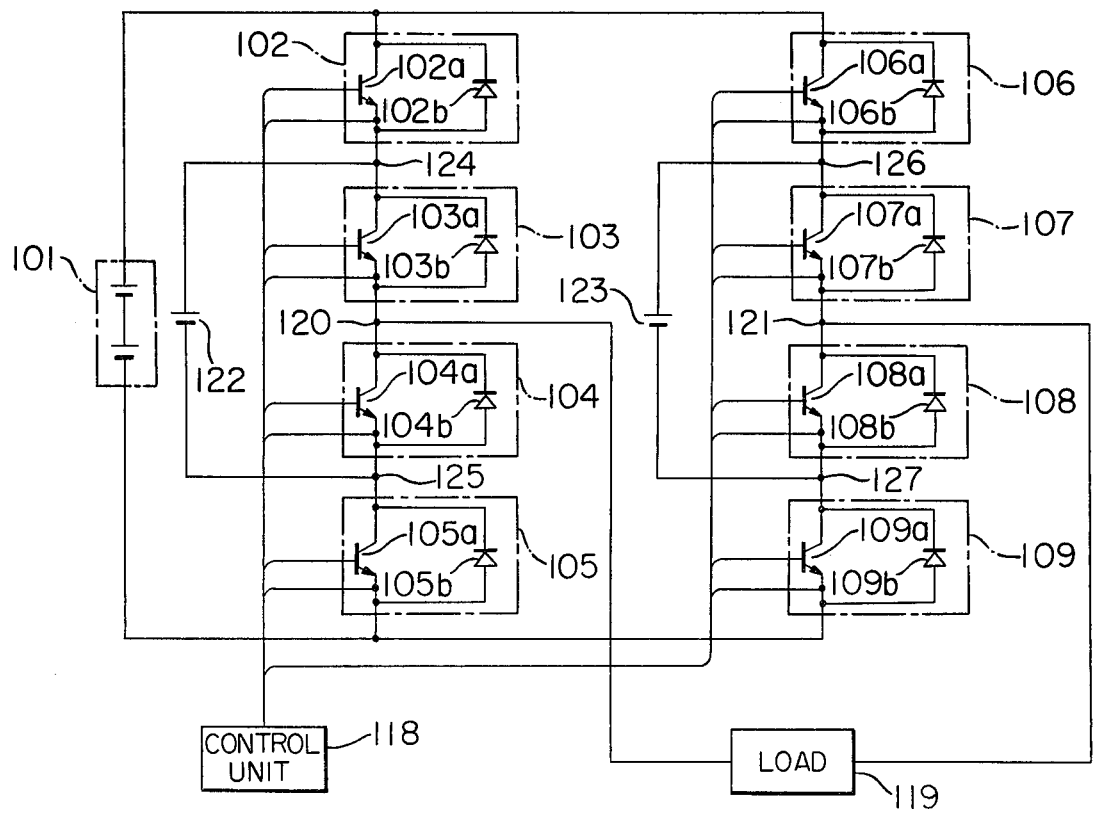
FIG. 11 is a circuit diagram showing another embodiment to which the present invention is applied.

FIG. 11 shows another embodiment. In the figure, numeral 101 designates a D.C. power source. Numerals 102-109 designate electronic switches, in which N-P-N transistors 102a-109a and diodes 102b-109b are connected in a parallel inverse relationship, respectively. The electronic switches 102 and 103, 104 and 105, 106 and 107, and 108 and 109 are respectively connected in series. Further, the series-connected assemblies are bridge-connected and then connected to the D.C. power source 101. Overvoltage suppressors (not shown), are respectively connected in parallel with the electronic switches 102-109. Numeral 118 indicates a control unit, which controls the N-P-N transistors 102a-109a in order to supply electric power necessary for a load 119 from the D.C. power source 101 and through the electronic switches 102-109. The load 119 is connected between the node 120 which is between the series-connected assembly of the electronic switches 102 and 103 and the series-connected assembly of the electronic switches 104 and 105 and the node 121 which is between the series-connected assembly of the electronic switches 106 and 107 and the series-connected assembly of the electronic switches 108 and 109. Shown at numerals 122 and 123 are auxiliary D.C. voltage sources. The voltage value of each of the auxiliary D.C. voltage sources 122 and 123 is half of the voltage value of the D.C. power source 101. The auxiliary D.C. voltage source 122 is connected to the node 124 between the series-connected electronic switches 102 and 103 and also to the node 125 between the other series-connected electronic switches 104 and 105. On the other hand, the auxiliary D.C. voltage source 123 is connected to the node 126 between the series-connected electronic switches 106 and 107 and also to the node 127 between the other series-connected electronic switches 108 and 109.

Figure 12:
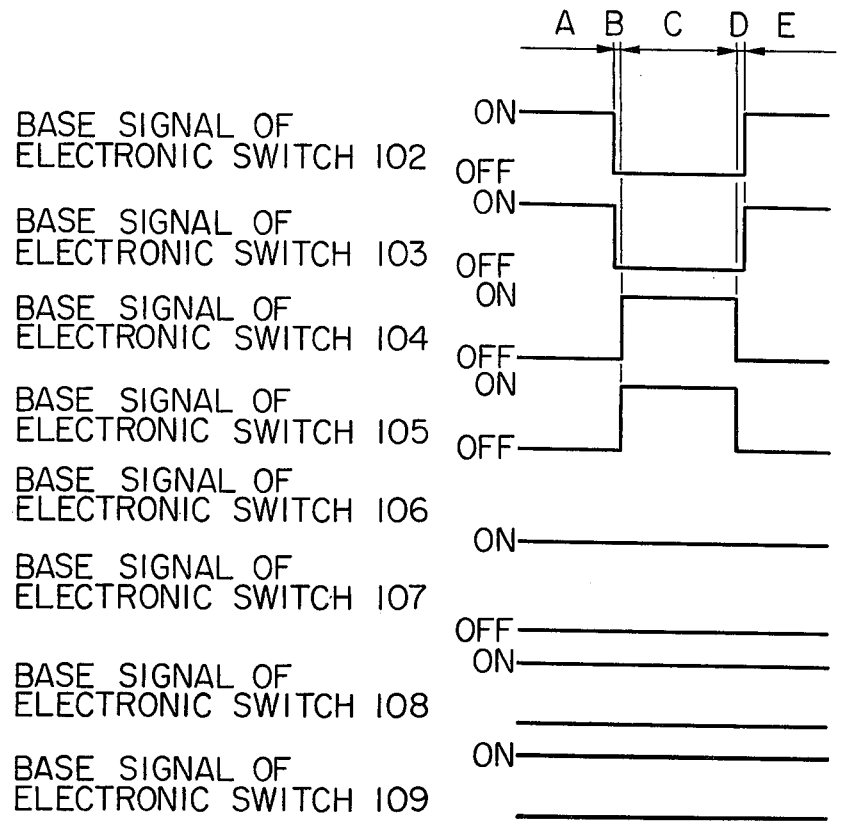
FIG. 12 is a signal waveform diagram showing operations in FIG. 11.

It is supposed that base signals shown in FIG. 12 are applied to the electronic switches 102-109 in FIG. 11 from the control unit 118. Letters A, B, C, D and E in FIG. 12 indicate operating periods of ON and OFF, and arrows at B and D indicate the switching times of the electronic switches and are several μs—several tens μs or so. There will be explained a case where the switching rates of the electronic switches 102 and 103 are unequal when the period A is to be shifted to the period B. First, let is be supposed that the electronic switch 102 turns "off" earlier. In this case, the electronic switch 103 is still "on". Assuming the load 119 to be inductive, therefore, a circulating circuit through the diode 105b, auxiliary D.C. voltage source 122, electronic switch 103, load 119, electronic switches 108 and 109 and diode 105b develops, so that a voltage equal to the difference between the voltages of the D.C. power source 101 and the auxiliary D.C. voltage source 122 appears across the electronic switch 102, no overvoltage appearing across the same. Thereafter, when the electronic switch 103 has turned "off", the period B begins. Secondly, let's consider a case where the electronic switch 103 turns "off" earlier. Since, in this case, the electronic switch 102 is still "on", a circulating circuit through the D.C. power source 101, electronic switch 102, auxiliary D.C. voltage source 122, diode 104b, load 119, electronic switches 108 and 109 and D.C. power source 101 develops, and the voltage of the auxiliary D.C. voltage source 122 appears across the electronic switch 103, no overvoltage appearing across the same. Thereafter, when the electronic switch 102 has turned "on", the period B begins. In the next place, there will be explained a case where the switching rates of the electronic switches 102 and 103 are unequal when the period D is to be shifted to the period E. First, let it be supposed that the electronic switch 102 turns "on" earlier. In this case, the situation is the same as in the case where the electronic switch 103 has turned "off" earlier in the foregoing shift of from the period A to the period B. On the other hand, in case the electronic switch 103 turns "on" earlier, the situation is the same as in the case where the electronic switch 102 has turned "off" earlier in the shift of from the period A to period B.

In this manner, in the circuit of FIG. 11, only the voltage equal to the difference between the voltages of the D.C. power source 101 and the auxiliary D.C. voltage source 122 or only the voltage of the auxiliary D.C. voltage source 122 is applied to the series-connected electronic switches 102 and 103. This also applies to the electronic switches 104 and 105.

In case the normal control signals of an inverter, not the simplified signals shown in FIG. 12, are impressed on the respective electronic switches from the control unit 118, the same also applies to the electronic switches 106-109, and only the voltage equal to the difference between the voltages of the D.C. power source 101 and the auxiliary D.C. voltage source 123 or only the voltage of the auxiliary D.C. voltage source 123 is applied thereto. Accordingly, when the voltage of each of the auxiliary D.C. voltage sources 122 and 123 is selected at a voltage less than the voltage of the the D.C. power source 101, in general, a voltage equal to half of the latter, no overvoltage is applied to the ein FIG. 12. In case the "off" of the electronic switch 102 is faster than the "off" of the electronic switch 103, the current is in the direction of flowing out from the positive electrode of the voltage source 122, whereas in case the "off" of the electronic switch 103 is faster than the "off" of the electronic switch 102, the current is in the direction of flowing into the positive electrode. Accordingly, a time difference is assigned to the base signals of the electronic switches 102 and 103, and the currents are detected so as to render their integrated value equal to zero. For example, in case the quantity of current flowing out from the positive electrode of the auxiliary D.C. power source 122 is larger, the base signals of the electronic switches 102 and 103 are controlled so that the "off" of the electronic switch 103 may become faster than the "off" of the electronic switch 102. Thus, only the alternating current is permitted to flow through the auxiliary D.C. power source 122, and the capacity of the power source can be made small.

Figure 13:
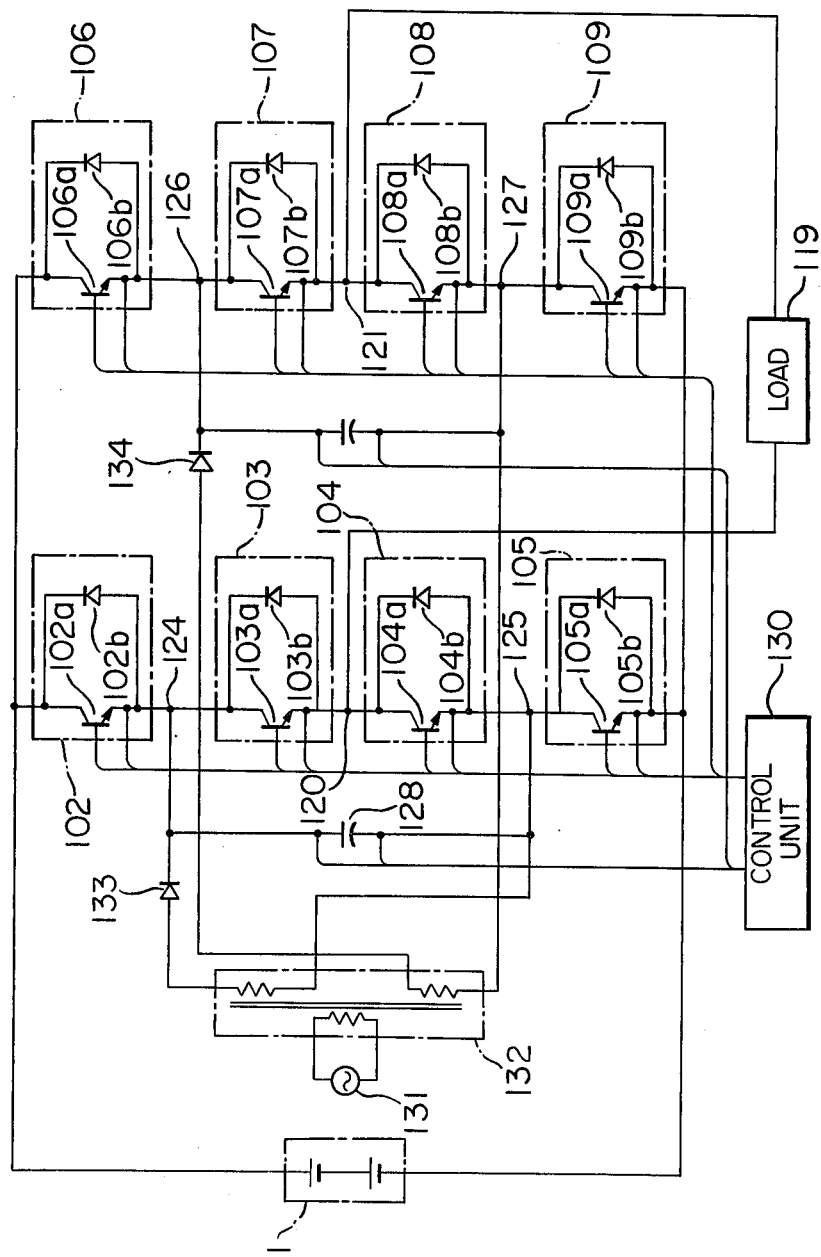
FIG. 13 is a circuit diagram showing another embodiment of the present invention.

FIG. 13 shows such an embodiment, in which capacitors 128 and 129 are employed as the auxiliary D.C. voltage sources. Numeral 130 indicates a control unit, which differs from the control unit 118 in FIG. 11 in that it detects the voltages of the capacitors 128 and 129 and controls the electronic switches 102-109 in association therewith. Numeral 131 indicates an A.C. power source, numeral 132 a transformer, and numerals 133 and 134 diodes. These elements constitute an initial charging circuit for the capacitors 128 and 129 serving as the auxiliary D.C. voltage sources. In order to make the integrated value of the currents flowing through the auxiliary D.C. voltage sources equal to zero as explained before, voltages are detected here, and not the currents. The reason is as follows. The capacitors 128 and 129 as the auxiliary D.C. voltage sources are charged by the A.C. power source 131, transformer 132 and diodes 133 and 134 which constitute the initial charging circuit. Herein the initial charging voltage value is held at a fixed value at all times, with the result that the integrated value of the currents flowing through the capacitors 128 and 129 can be made equal to zero. The control unit 130 detects the voltages of the capacitors 128 and 129 and compares them with the initial charging voltage value as a reference value, whereupon it controls the electronic switches 102-109 as explained above so as to equalize the detected and reference voltages at all times. The transformer 132 is allowed to be small in capacity because it is used for the initial charging.

Figure 14:
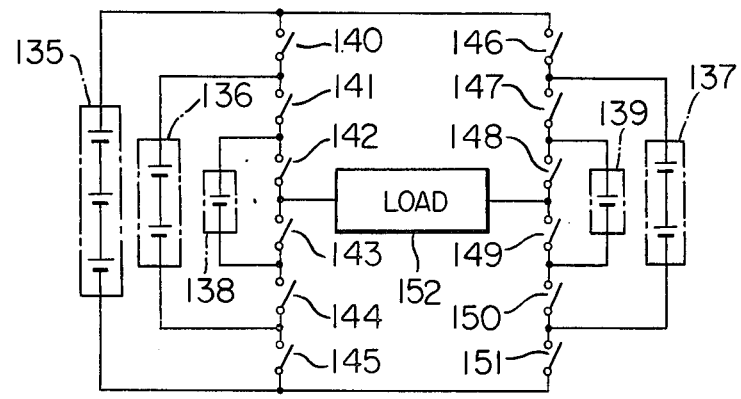
FIG. 14 is also a circuit diagram showing another embodiment of the present invention.

While, in FIG. 11, the number of the series-connected electronic switches has been two, FIG. 14 shows an embodiment in the case where it is three. Referring to the figure, numeral 135 indicates a D.C. power source, and numerals 136 and 137 indicate first auxiliary D.C. voltage sources, each of which has a voltage value equal to 2/3 of the voltage of the D.C. power source 135. Numerals 138 and 139 indicate second auxiliary D.C. voltage sources each of which has a voltage value equal to ⅓ of the voltage of the D.C. power source 135. Numerals 140-142, 143-145, 146-148 or 149-151 indicate three switches connected in series, and the groups of the series-connected switches are bridge-connected. Numeral 152 is a load. By connecting the first auxiliary D.C. voltage sources 136 and 137 and the second auxiliary D.C. voltage sources 138 and 139 as illustrated in FIG. 14, only the voltage equal to ⅓ of the voltage of the D.C. power source 135 is applied to each of the switches 140-151.

In general, in case one series-connected assembly is constructed of n switches, there may be prepared first auxiliary D.C. voltage sources having a voltage value equal to $(n-1)n$ of the voltage of a D.C. power source, second auxiliary D.C. voltage sources having a voltage value equal to $(n-2)n$, . . . and $(n-1)$-th auxiliary D.C. voltage sources having a voltage value equal to $1/n$.

What is claimed is:

1. In a chopper which is interposed between a D.C. power source and a load and which comprises a plurality of switching elements which are connected between one terminal of said D.C. power source and one terminal of said load and a plurality of series-connected diodes which are connected between another terminal of the D.C. power source and said one terminal of said load; a series-connected assembly of electronic switches which comprise said plurality of switching elements, wherein an auxiliary D.C. voltage source which is independent of an output of said chopper whose voltage is lower than a voltage of said D.C. power source is connected between a node in said series-connected assembly of said electronic switches and a node in said series-connected plurality of diodes, so as to thereby prevent any overvoltage from being applied to one of said switching elements and one of said diodes.

2. A series-connected assembly of electronic switches as defined in claim 1, wherein said plurality of switching elements are individually controlled with respect to either a current through or a voltage across said auxiliary D.C. voltage source.

3. A series-connected assembly of electronic switches as defined in claim 2, wherein said auxiliary D.C. voltage source comprises a capacitor, and said plurality of switching elements are individually controlled so that a summation of inputs to and outputs from said capacitor are equal to zero.

4. In a chopper wherein in order to control the feeding of electric power from a D.C. power source to a load, first and second series-connected assemblies, in each of which n electronic switches are connected in series, are respectively connected between at least one terminal of said load and both electrodes of the D.C. power source; said series-connected assemblies of electronic switches are arranged such that $(n-1)$ auxiliary D.C. voltage sources which are independent of an output of said chopper and which each have a voltage which is lower than a voltage of said D.C. power source are connected between nodes of $(n-1)$ electronic switches in said first series-connected assembly and nodes of $(n-1)$ electronic switches in said second series-connected assembly, so as to thereby prevent any overvoltage from being applied to one of said electronic switches.

5. A series-connected assembly of electronic switches as defined in claim 4, wherein in order to control either voltages across or currents through said auxiliary D.C. voltage sources, on-off signals of said electronic switches in said first or second series-connected assemblies are individually controlled.

6. A series-connected assembly of electronic switches as defined in claim 4, wherein said auxiliary D.C. voltage sources comprises capacitors, and said on-off signals of said electronic switches are individually controlled so that a summation of inputs to and outputs from said capacitors are equal to zero.

* * * * *